(12) United States Patent
Whitton

(10) Patent No.: US 11,305,623 B2
(45) Date of Patent: Apr. 19, 2022

(54) SLIDING AND PIVOTING REAR VEHICLE DOOR

(71) Applicant: KARMA AUTOMOTIVE LLC, Irvine, CA (US)

(72) Inventor: Phillip Paul Whitton, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 137 days.

(21) Appl. No.: 16/706,109

(22) Filed: Dec. 6, 2019

(65) Prior Publication Data

US 2021/0170840 A1 Jun. 10, 2021

(51) Int. Cl.
*B60J 5/04* (2006.01)
*E05D 3/12* (2006.01)
*B60J 5/06* (2006.01)

(52) U.S. Cl.
CPC ............ *B60J 5/0479* (2013.01); *B60J 5/0468* (2013.01); *B60J 5/0473* (2013.01); *B60J 5/06* (2013.01); *E05D 3/127* (2013.01); *E05Y 2900/532* (2013.01)

(58) Field of Classification Search
CPC ...... B60J 5/0479; B60J 5/0468; B60J 5/0473; B60J 5/06; E05D 3/127
USPC ......................................................... 296/155
See application file for complete search history.

(56) References Cited

U.S. PATENT DOCUMENTS

| 6,382,705 | B1* | 5/2002 | Lang ..................... B60J 5/0479 296/146.12 |
| 7,950,719 | B2 | 5/2011 | Elliott et al. |
| 9,079,477 | B2* | 7/2015 | Maruyama .............. B60J 5/047 |
| 9,849,759 | B2 | 12/2017 | Lovelace et al. |
| 2003/0160476 | A1* | 8/2003 | Moriyama .............. B60J 5/043 296/202 |
| 2006/0061135 | A1* | 3/2006 | Oxley ....................... B60J 5/06 296/155 |

(Continued)

FOREIGN PATENT DOCUMENTS

| EP | 1 068 970 A1 | 1/2001 |
| JP | 2009155876 A | 7/2009 |
| KR | 10-2013-0033768 A | 4/2013 |

OTHER PUBLICATIONS

International Search Report and Written Opinion dated Feb. 26, 2021 issued in related International PCT Application No. PCT/US2020/062623; filed Nov. 30, 2020.

*Primary Examiner* — Joseph D. Pape
(74) *Attorney, Agent, or Firm* — Gordon Rees Scully Mansukhani, LLP

(57) ABSTRACT

A door opening system for a rear door of a motor vehicle in which a rear door first moves backwards and outwardly away from the car shell prior to the rear door then swinging outwardly away from the front of the car. The car shell does not have a B-pillar so that a large, convenient opening is provide with the front door opening forwardly and the rear door opening rearwardly. The door opening system includes: a car shell; a rear slider rail attached to the car shell; a rear door hinge assembly configured to move along the rear slider rail; with the rear door mounted onto the rear door hinge assembly, wherein the rear door hinge assembly moves along the rear slider rail in a direction rearwardly and away from the car shell prior to the rear door being outwardly rotatable on the rear door hinge assembly.

20 Claims, 6 Drawing Sheets

(56) References Cited

U.S. PATENT DOCUMENTS

| 2007/0152473 | A1 | 7/2007 | Lechkun et al. |
| 2009/0072583 | A1* | 3/2009 | Elliott ................... B60J 5/0479 296/155 |
| 2012/0049577 | A1 | 3/2012 | Thomas et al. |

* cited by examiner

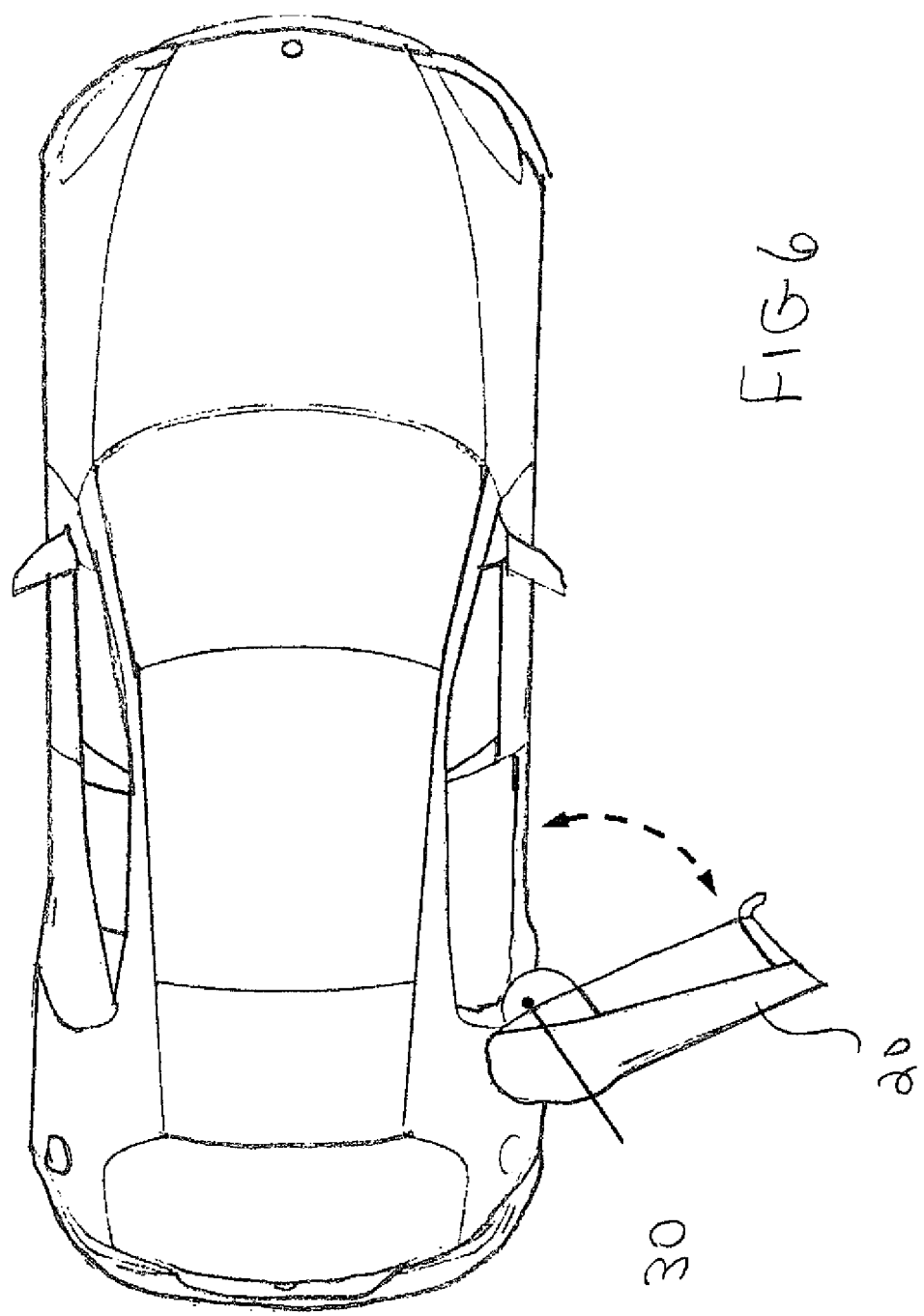

SLIDING AND PIVOTING REAR VEHICLE DOOR

TECHNICAL FIELD

The present system relates to motor vehicle door opening systems.

SUMMARY

In preferred aspects, the present system provides a door opening system for a rear door of a motor vehicle, comprising: a car shell; a rear slider rail attached to the car shell; a rear door hinge assembly configured to move along the rear slider rail; and a rear door mounted to the rear door hinge assembly. The rear door hinge assembly moves along the rear slider rail in a direction outwardly away from the car shell prior to the rear door being outwardly rotatable on the rear door hinge assembly.

Advantages of the present rear door opining system include both its aesthetic appeal, and the fact that it provides a large opening area making it easier for people to enter and exit the vehicle. The large opening area is especially desirable in the preferred embodiments of the present system in which the car shell does not have a B-pillar. In such cases, the front door swings open forwardly and the back door swings open rearwardly, thus opening the entire side of the vehicle for ease of access.

In preferred aspects, the system further includes upper and lower slide rails (attached to a mid-portion of a side of the car shell, one above the other). When the rear door is in its closed and locked position, the rear door is connected into the upper and lower sliding rails. However, when the rear portion of the rear door is moved outwardly, the front portion of the rear door unlatches from the upper and lower sliding rails. A rear slider rail (at the back of the rear door) is attached to a C-pillar of the car shell.

In operation, a rear portion of the rear door first moves outwardly (away from the car shell) prior to the forward portion of the rear door pivoting outwardly (on a hinge assembly) away from the car shell. Preferably, the rear door rotates outwardly on the hinge assembly after the door has already been moved to its fully outward positon of travel along the rear slider rail. In this configuration, the rear sliding rail is preferably disposed at an angle to the longitudinal axis of the car shell, and the upper and lower slider rails are preferably disposed generally parallel to a longitudinal axis of the car shell.

Preferably, the present car shell does not have a B-pillar such that the front door is attached to the A-pillar of the car shell and the rear door is attached to the C-pillar of the car shell. The front door swings open forwardly and the rear door swings open rearwardly (i.e.: the front and rear doors open outwardly rotating in opposite directions). This provides a large, open area therebetween for vehicle ingress and egress.

BRIEF DESCRIPTION OF THE DRAWINGS

FIG. 6 is a top plan view showing the rear door moved to a second fully rotated open position.

DETAILED DESCRIPTION OF THE DRAWINGS

Figure 1:
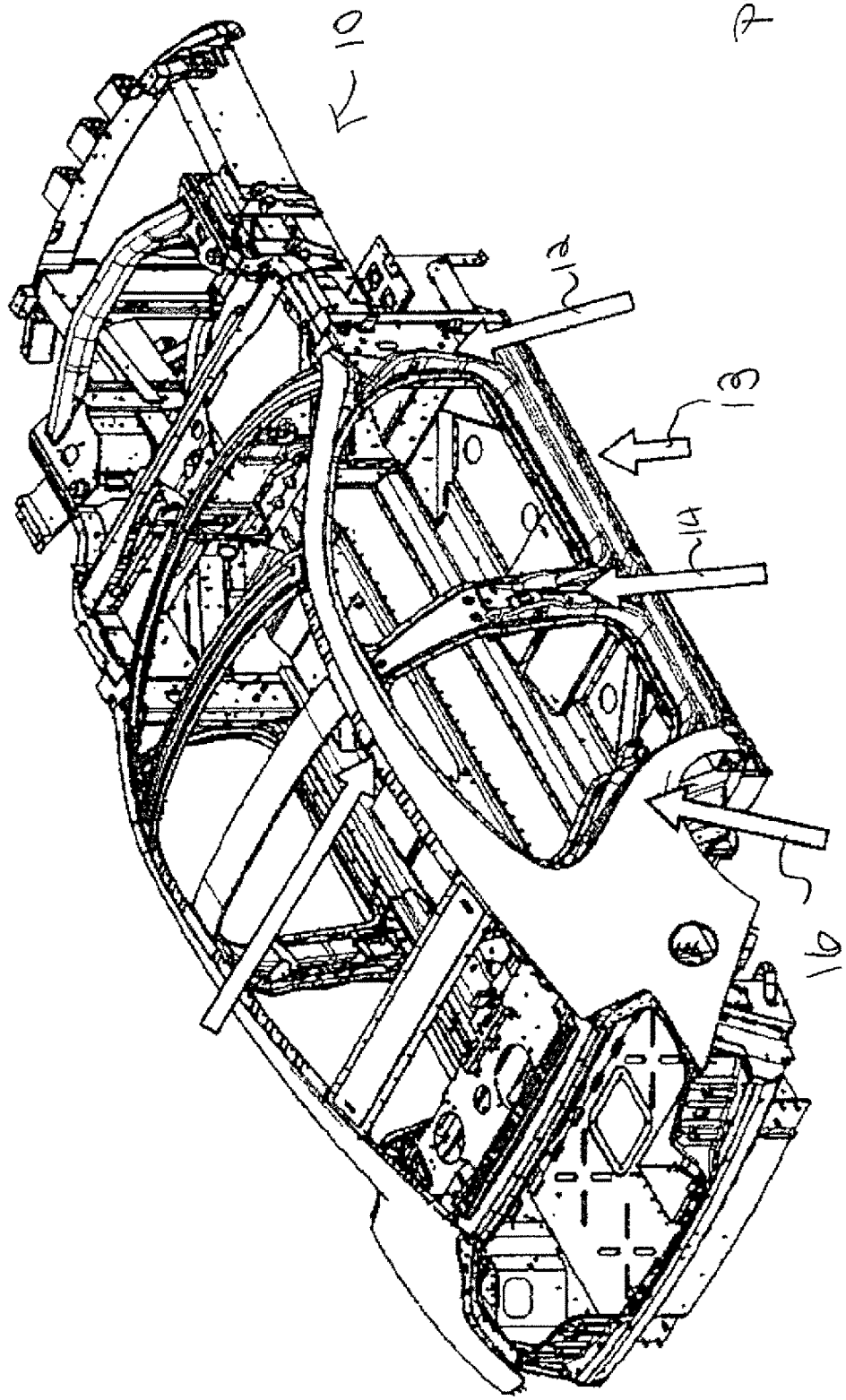
FIG. 1 is a perspective view of a prior art car shell showing the locations of the standard A-, B-, and C-pillars.
Figure 2:
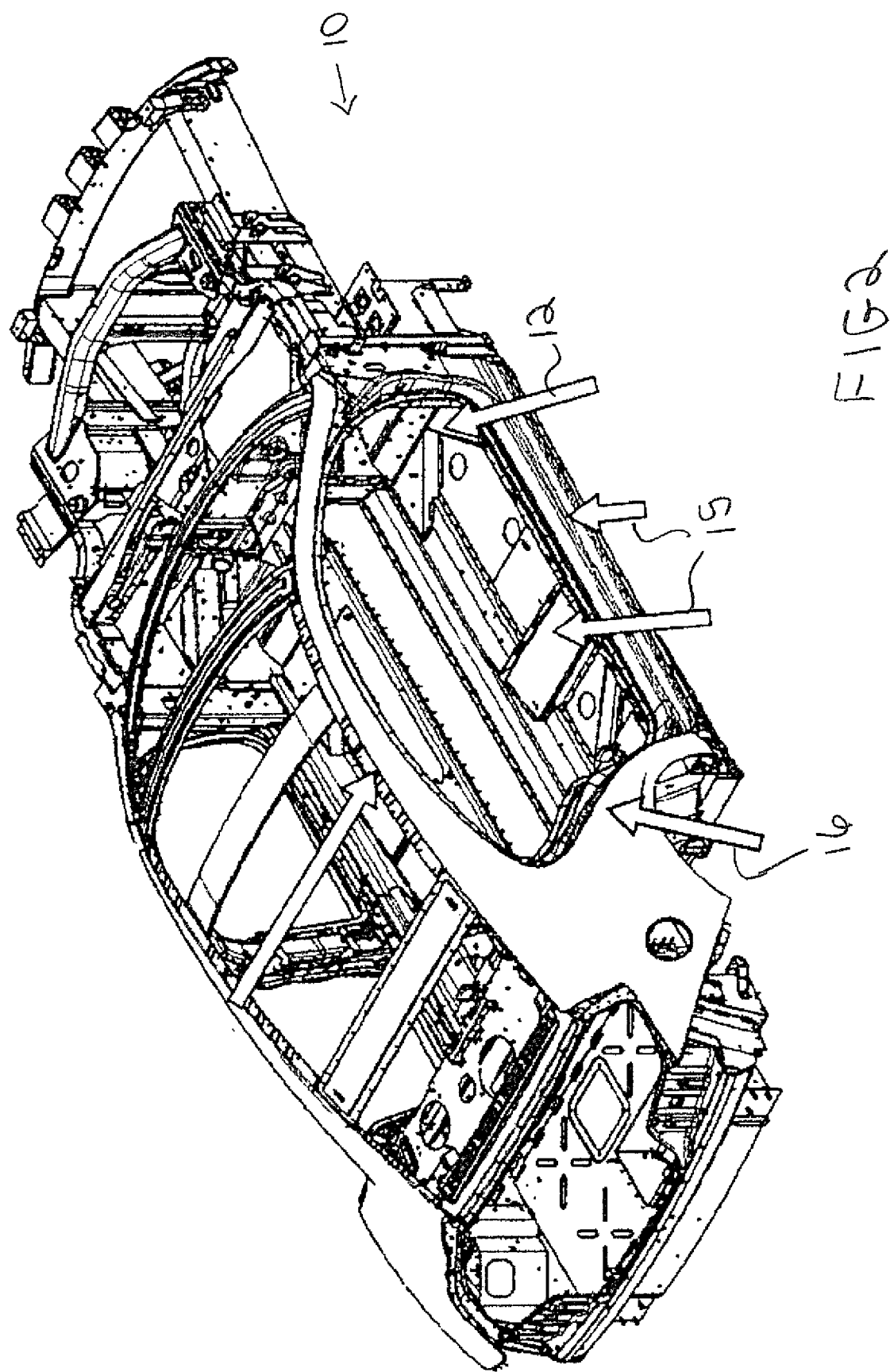
FIG. 2 is a perspective view of the present car shell showing the removed B-pillar.

The present rear door opening system is best suited for use with a motor vehicle not having a standard B-pillar. For example, FIG. 1 shows a perspective view of a prior art car shell 10 showing the locations of the standard A-pillar 12, B-pillar 14, and C-pillar 16. By comparison, FIG. 2 is a perspective view of the present car shell 10 showing the B-pillar removed. As can be seen, removal of the B-pillar in the present shell 10 produces a large opening 15 in the car shell 10 between A-pillar 12 and C-pillar 16. As will be explained below, the front and rear doors of the car close to seal large opening 15 and open to exposed large opening 15. As will be shown, the front and rear doors and rotate in opposite directions to maximize passenger space in large opening 15 when entering or exiting the vehicle.

Figure 3:
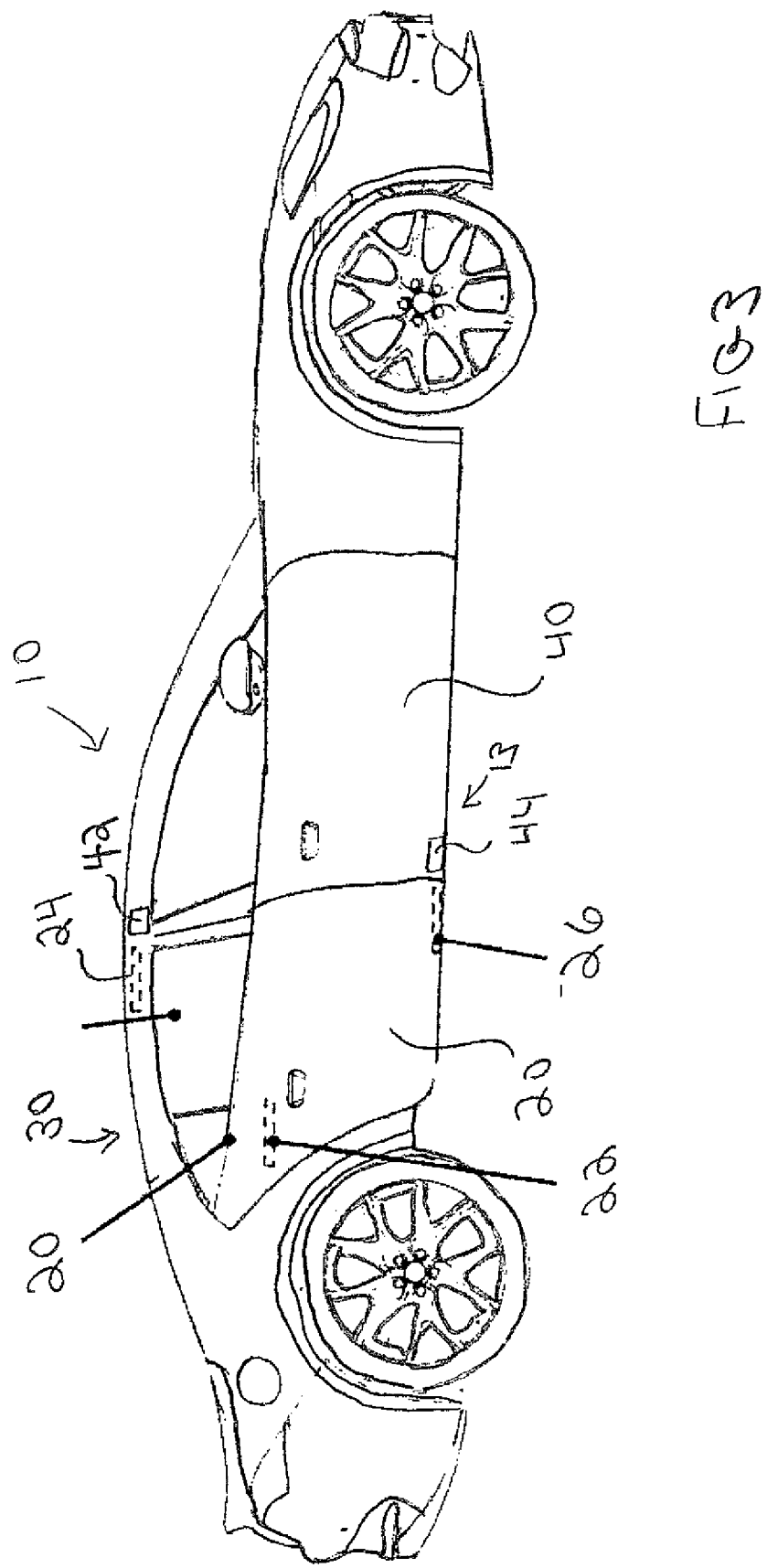
FIG. 3 is a side elevation view of a vehicle equipped with the present rear door opening system.
Figure 4:
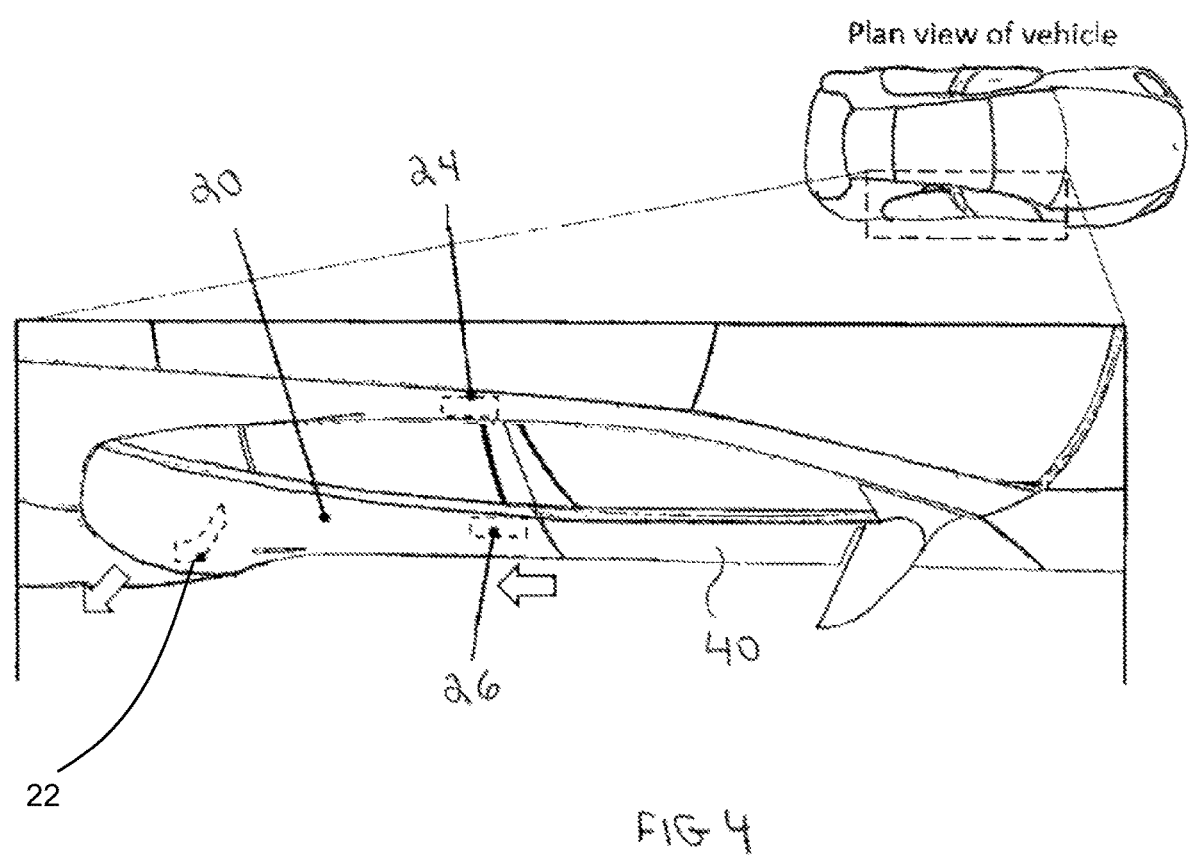
FIG. 4 is a top plan view of the door area shown in FIG. 3.

As best seen in FIGS. 3 and 4, the present rear door opening system comprises: the car shell 10; a rear door 20; a rear slider rail 22 attached to car shell 10; a rear door hinge assembly 30 configured to move along rear slider rail 22; with the rear door 20 mounted to the rear door hinge assembly 30.

Figure 5:
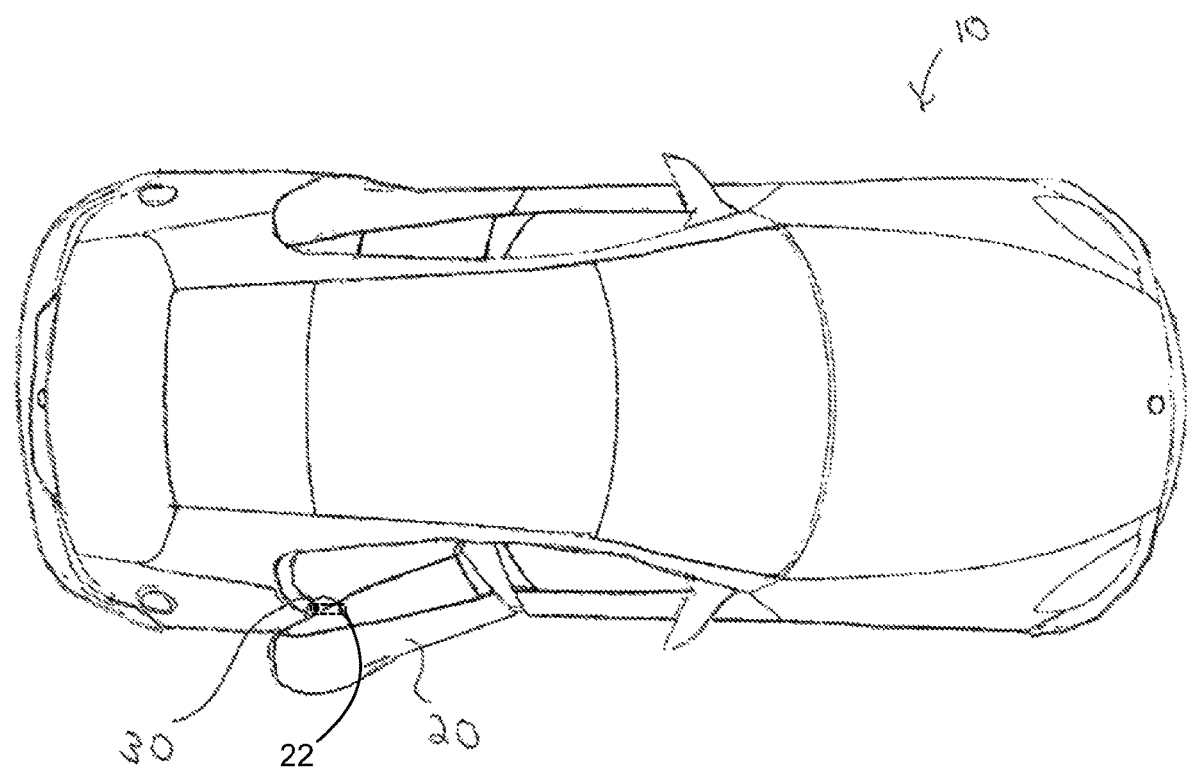
FIG. 5 is a top plan view showing the rear door moved to a first outward position.

The movement of rear door 20 from the closed position (FIG. 4) to the first open position (FIG. 5) occurs as follows. As rear door 20 is first opened, the rear door hinge assembly 30 moves along the rear slider rail 22 in a direction outwardly away from car shell 10 (FIG. 5). Next, as seen in FIG. 6, the rear door 20 is rotated outwardly on rear door hinge assembly 30 to the position as shown.

As seen in FIGS. 3 and 4, rear door 20 is also supported by an upper slider rail 24 attached to the car shell, and a lower slider rail 26 also attached to the car shell. The forward portion of rear door 20 is connected to both the upper sliding rail 24 and the lower sliding rail 26 when the rear door 20 is in its closed forward position (FIG. 4). Next, when the rear door 20 starts to open (i.e.: when it moves outwards from the car shell to the position shown in FIG. 5), the forward portion of rear door 20 is released from, i.e.: is no longer connected to, the upper and lower sliding rails 24 and 26.

As can be seen best in FIG. 3 (and FIG. 1), upper slider rail 26 is attached to a mid-portion of a side of the car shell, and lower slider rail 26 is also attached to a mid-portion of a side of the car shell with upper slider rail 24 positioned generally above lower slider rail 26. Preferably, upper slider rail 24 is connected to a roof rail of the car shell and lower slider rail 26 is connected to a sill 13 of the car shell. The forward portion of the rear door 20 travels along the upper and lower sliding rails 24 and 26 as the front of rear door 20 moves rearwardly (from the position of FIG. 4 to FIG. 5). As seen in FIG. 6, rear door 20 then rotates outwardly (on hinge assembly 30) to an angle of 50 to 85 degrees away from the car shell 12 when door 20 is fully opened. As such, upper and lower slider rails 24 and 26 are preferably disposed generally parallel to a longitudinal axis of the car shell. In contrast (as best seen in FIG. 4) rear sliding rail 22 is preferably disposed at an angle to the longitudinal axis of the car shell (such that rear door 20 moves outwardly away from the car when the door is moved from the position of FIG. 4 to that of FIG. 5).

As seen in FIG. 5, the rear portion of rear door 20 preferably moves outwardly approximately 30 degrees prior to a forward portion of the rear door pivoting outwardly. As seen in FIG. 6, rear door 20 then rotates outwardly to an angle of 50 to 85 degrees away from the car shell when the rear door is fully opened. Preferably, rear door hinge assembly 30 pivots about a generally vertical axis when pivoting outwardly.

As also seen in FIG. 3, the car also has a front door 40 attached to the A-pillar 12 of car shell 10. An upper latch 42 attached to a mid-portion of a roof rail of the car shell, and a lower latch 44 attached to a mid-portion of sill of the car shell can be used to hold front door 40 closed (since there is no B-pillar onto which a typical front door would be mounted.

As can be understood, the front and rear doors 20 and 40 open outwardly rotating in opposite directions. This provides a large open space 15 for people to enter or exit the vehicle.

What is claimed is:

1. A door opening system for a rear door of a motor vehicle, comprising:
    a car shell;
    a rear slider rail attached to the car shell;
    a rear door hinge assembly configured to move along the rear slider rail; and
    a rear door mounted to the rear door hinge assembly,
    wherein the rear door hinge assembly moves along the rear slider rail in a direction outwardly away from the car shell prior to the rear door being outwardly rotatable on the rear door hinge assembly.

2. The door opening system of claim 1, further comprising:
    an upper slider rail attached to the car shell; and
    a lower slider rail attached to the car shell,
    wherein a forward portion of the rear door is connected to the upper and lower slider rails when the rear door is in a closed position, and
    wherein the forward portion of the rear door is not connected to the upper and lower slider rails when the rear door is in an open position.

3. The door opening system of claim 2, wherein:
    the upper slider rail is attached to a mid-portion of a side of the car shell,
    the lower slider rail is attached to a mid-portion of a side of the car shell, and
    the rear slider rail is attached to a C-pillar of the car shell.

4. The door opening system of claim 3, wherein the upper slider rail is positioned above the lower slider rail.

5. The door opening system of claim 1, wherein a rear portion of the rear door moves outwardly away from the car shell prior to a forward portion of the rear door pivoting outwardly away from the car shell.

6. The door opening system of claim 5, wherein the forward portion of the rear door travels along the upper and lower slider rails as the rear portion of the rear door moves outwardly.

7. The door opening system of claim 1, wherein the rear door rotates outwardly to an angle of 50 to 85 degrees away from the car shell when the rear door is fully opened.

8. The door opening system of claim 1, wherein the rear door rotates outwardly around the rear door hinge assembly after the rear door has moved to an outmost positon of travel along the rear slider rail.

9. The door opening system of claim 1, wherein the car shell does not have a B-pillar.

10. The door opening system of claim 1, wherein the upper slider rail is connected to a roof rail of the car shell.

11. The door opening system of claim 1, wherein the lower slider rail is connected to a sill of the car shell.

12. The door opening system of claim 1, wherein the upper and lower slider rails are disposed generally parallel to a longitudinal axis of the car shell.

13. The door opening system of claim 1, wherein the rear slider rail is disposed at an angle to the longitudinal axis of the car shell.

14. The door opening system of claim 1, wherein the rear door hinge assembly pivots about a generally vertical axis when pivoting outwardly.

15. The door opening system of claim 1, wherein a rear portion of the rear door moves outwardly approximately 30 degrees prior to a forward portion of the rear door pivoting outwardly.

16. The door opening system of claim 2, wherein outward motion of the rear door releases the rear door from the upper and lower slider rails.

17. The door opening system of claim 1, further comprising: a front door attached to the car shell.

18. The door opening system of claim 17, wherein the front door is attached to an A-pillar of the car shell.

19. The door opening system of claim 17, further comprising:
    an upper latch attached to a mid-portion of a roof rail of the car shell, and
    a lower latch attached to a mid-portion of sill of the car shell,
    wherein a rear portion of the front door latches onto the upper and lower latches when the front door is closed.

20. The door opening system of claim 17, wherein the front and rear doors open outwardly rotating in opposite directions.

* * * * *